(12) United States Patent
Wu

(10) Patent No.: US 7,845,251 B2
(45) Date of Patent: Dec. 7, 2010

(54) ROLLER SCREW HAVING PLURAL CIRCULATING DEVICES COOPERATING WITH PLURAL HELICAL GROOVES

(75) Inventor: Wen-Chia Wu, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 260 days.

(21) Appl. No.: 12/210,180

(22) Filed: Sep. 12, 2008

(65) Prior Publication Data

US 2010/0064836 A1 Mar. 18, 2010

(51) Int. Cl.
*F16H 1/24* (2006.01)
*F16H 55/02* (2006.01)

(52) U.S. Cl. ............... 74/424.86; 74/424.87; 74/424.82

(58) Field of Classification Search .............. 74/424.81, 74/424.82, 424.83, 424.86, 484.87, 424.84
See application file for complete search history.

(56) References Cited

U.S. PATENT DOCUMENTS

| | | | | |
|---|---|---|---|---|
| 5,791,192 A | * | 8/1998 | Lee ......................... | 74/424.87 |
| 6,425,302 B2 | * | 7/2002 | Greubel .................... | 74/424.87 |
| 6,481,305 B2 | * | 11/2002 | Nishimura et al. ........ | 74/424.83 |
| 6,561,053 B2 | * | 5/2003 | Greubel .................... | 74/424.87 |
| 7,523,682 B2 | * | 4/2009 | Liao et al. ................. | 74/424.87 |
| 2004/0211280 A1 | * | 10/2004 | Nishimura et al. ........ | 74/424.82 |
| 2008/0302197 A1 | * | 12/2008 | Liu et al. ................... | 74/424.82 |

* cited by examiner

*Primary Examiner*—Thomas R Hannon
*Assistant Examiner*—Justin Krause
(74) *Attorney, Agent, or Firm*—Banger Shia

(57) ABSTRACT

A roller screw having plural circulating devices cooperating with plural helical grooves comprises a screw, a nut, plural rollers and circulating devices. The screw is provided in a surface with at least two helical grooves. The nut is provided with helical grooves opposite to the screw and receiving holes in a peripheral wall thereof, and each receiving hole is provided with a fixing groove at each of two ends thereof. The rollers are arranged in the helical grooves of the screw and the nut. The circulating devices have the same number of the helical grooves of the screw, and each circulating device includes an opening at each of two ends thereof and a passage between the two openings.

4 Claims, 5 Drawing Sheets

ROLLER SCREW HAVING PLURAL CIRCULATING DEVICES COOPERATING WITH PLURAL HELICAL GROOVES

BACKGROUND OF THE INVENTION

1. Field of the Invention

The present invention relates to a roller screw for linear transmission, and more particularly to a roller screw having plural circulating devices cooperating with plural helical grooves.

2. Description of the Prior Art

As for the design of controlling the movement of the stages or the processing elements in the precision machines, in order to control the feed amount precisely and reduce the friction coefficient, a roller screw is commonly used for transmission. Though the circulation systems are various in structures, they are generally categorized into two types: one type is one screw cooperating with one nut, and the other type is one nut cooperating with two nuts. The structure design of providing helical grooves cooperating with plural rollers between the screw and the nut generally has the following types:

A. One screw cooperates with one nut, each of the screw and the nut is provided with a helical groove, and plural rollers are arranged in parallel in the helical grooves. By using such a single helical groove, the rolling direction and angle of all the rollers are the same, so that when the nut rotates, the screw is unilaterally subjected to a force along the moving direction of the rollers in the helical grooves, it thus is only able to bear a unidirectional load. As a result, this design can only be applied to a machine which is unilaterally subjected to a force (such as: injection molding machine, mold closing machine, etc)

B. One screw cooperates with a nut, each of the screw and the nut is provided with one helical groove, and plural rollers are arranged in the helical grooves in a stagger manner. Though this stagger arrangement can achieve the objective of sharing the load evenly in two directions, the number of the rollers bearing the load in each direction is only half of the total rollers (because the rollers are arranged in the stagger manner), so this design still has poor loading capability, namely, poor rigidity.

C. One screw cooperates with two nuts, each of the screw and the nuts is provided with one helical groove, and plural rollers are arranged in the helical grooves parallel to one another. In such a structure design of a single nut cooperating with two nuts, the rollers with different tilting angles are respectively arranged in two nuts, so that the roller screw can bear the load in two directions. However, since there are two nuts, the total length of the nuts on the screw is relatively increased, thus relatively increasing the manufacturing and material cost. In addition, the contact surface between the two nuts requires much higher surface precision and parallelism, so the fabrication difficulty is increased, and the installation of the nuts is very complex and time-consuming, thus increasing the fabrication cost.

The present invention has arisen to mitigate and/or obviate the afore-described disadvantages.

SUMMARY OF THE INVENTION

The technical problems to be solved are described as below:

In the existing structures that a screw cooperates with nuts for circulation of rollers, in order to enable the rollers to bear bi-directional force, a screw commonly cooperates with two nuts in which rollers with different tilting angles are respectively arranged, the rollers in the respective nuts are used to bear the force in different directions, although such a design can increase the load capability (rigidity), since there are two nuts, the total length of the nuts are increased to shorten the travel of the nut on the screw, and the contact surface between the two nuts requires higher surface precision and parallelism, thus increasing the fabrication difficulty and cost and taking lots of time to assemble.

The present invention has the following technical characteristics:

The present invention relates to a roller screw having plural circulating devices cooperating with plural helical grooves, which comprises a screw, a nut, plural rollers and circulating devices. The screw is provided in a surface with at least two helical grooves. The nut is provided with helical grooves opposite to the screw and receiving holes in a peripheral wall thereof, and each receiving hole is provided with a fixing groove at each of two ends thereof. The rollers are arranged in the helical grooves of the screw and the nut. The circulating devices have the same number of the helical grooves of the screw, and each circulating device includes an opening at each of two ends thereof and a passage between the two openings. By such arrangements, the openings at two ends of the respective circulating devices, which are connected with the helical grooves, are connected to different helical grooves of the nut, so that the helical grooves of the nut form a single circulation path for rollers through the respective circulating devices.

The present has the following advantages:

The primary objective of the present invention is to provide a roller screw having plural circulating devices cooperating with plural helical grooves, which utilizes a screw to cooperate with a single nut which is interiorly provided with two circulating devices to communicate the first helical grooves with the second helical grooves, so that the rollers can circulate between the screw and the nut in a single circulation mode, and the rollers in the different helical grooves rotate in different directions to bear bi-directional load and have double load capability, in addition, the circulation is realized through the two openings at two ends of the circulating device and a passage between the two openings, so that the present invention has the advantages: simplified structure, easy to fabricate and assemble, without high precision fabrication and installation.

DETAILED DESCRIPTION OF THE PREFERRED EMBODIMENTS

Figure 1:
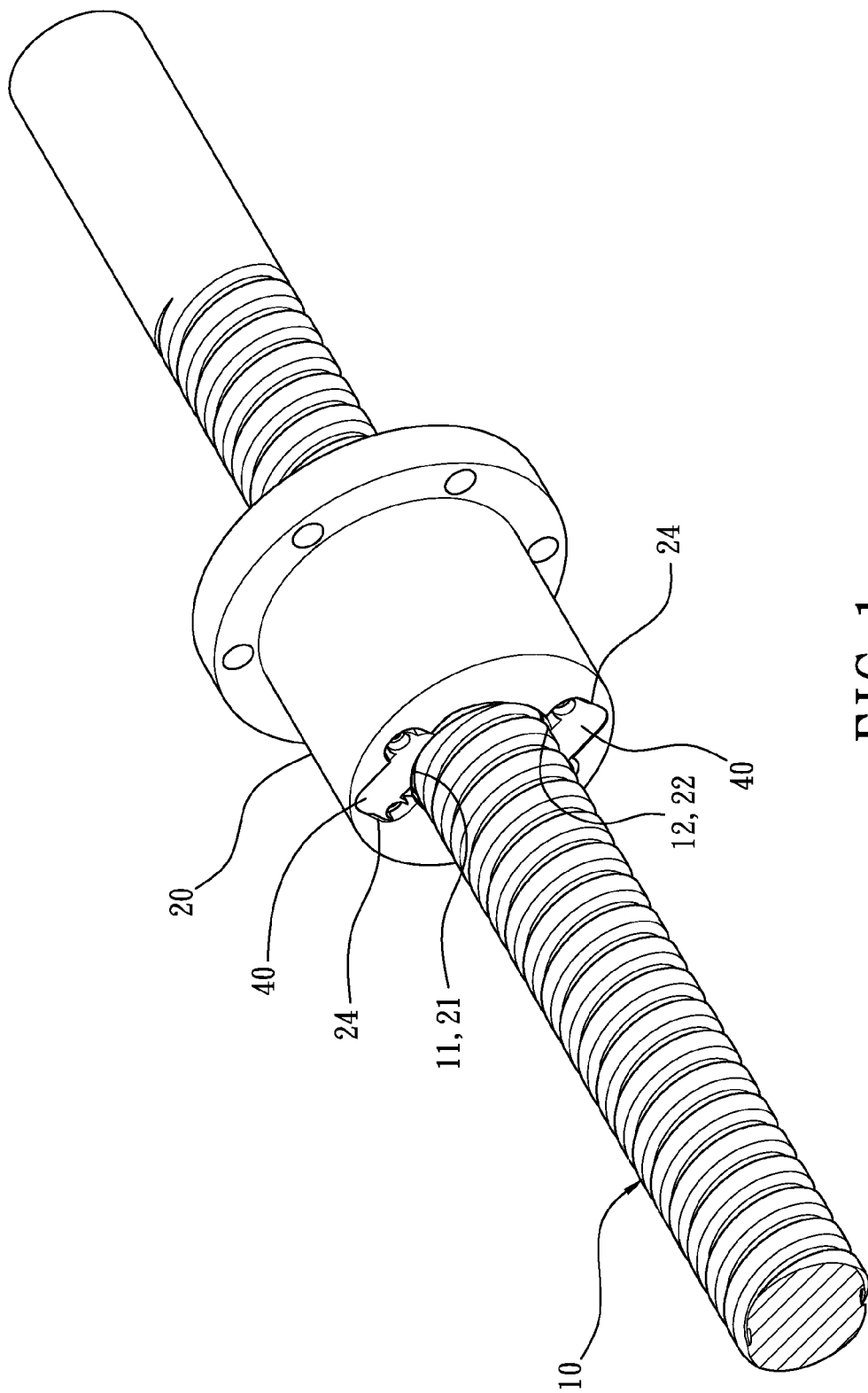
FIG. 1 is an assembly view of a roller screw having plural circulating devices cooperating with plural helical grooves in accordance with the present invention.
Figure 2:
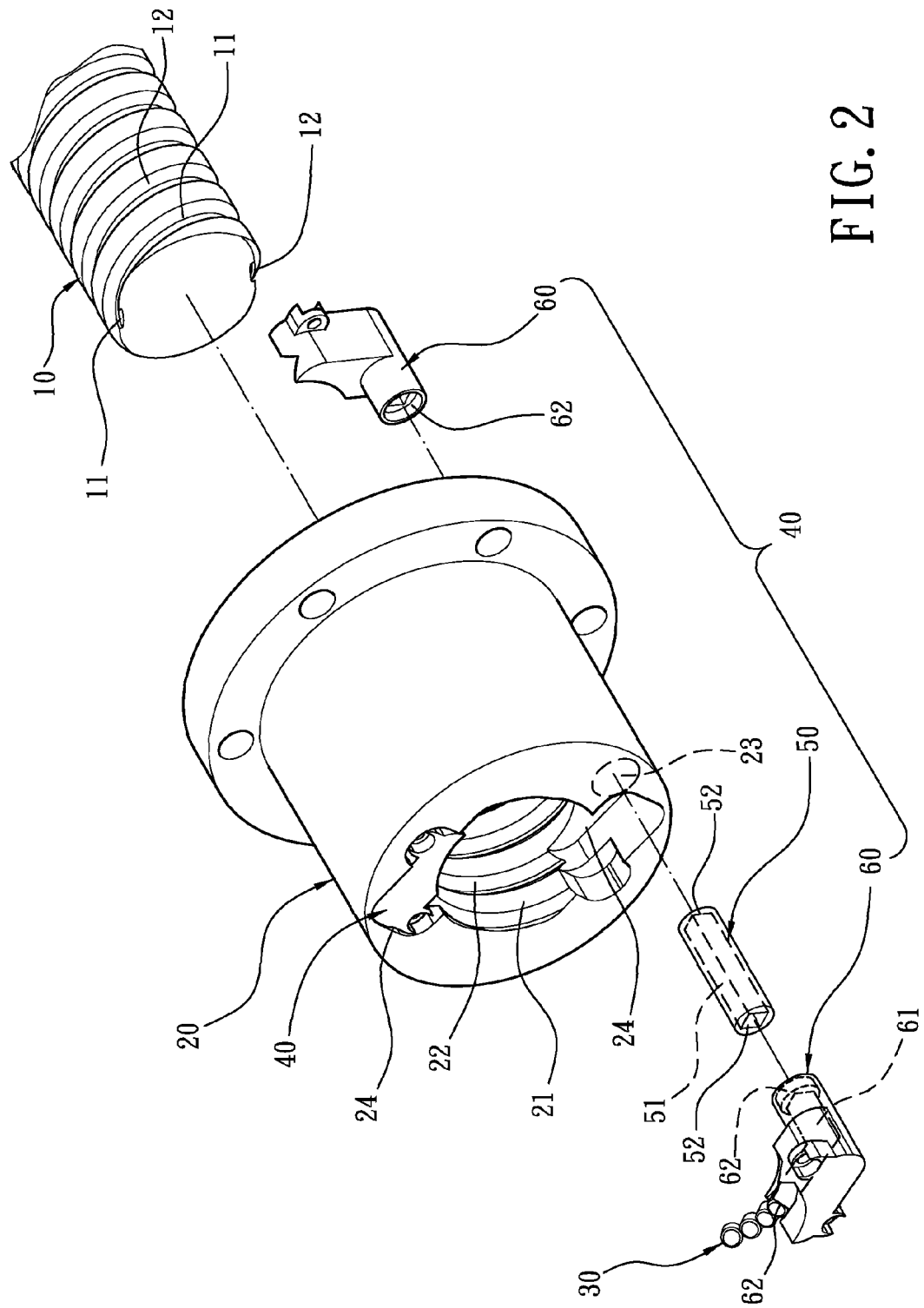
FIG. 2 is an exploded view of the roller screw having plural circulating devices cooperating with plural helical grooves in accordance with the present invention.

The present invention will be clearer from the following description when viewed together with the accompanying drawings, which show, for purpose of illustrations only, the preferred embodiment in accordance with the present invention.

Referring to FIGS. 1-4, a roller screw having plural circulating devices cooperating with plural helical grooves in accordance with a preferred embodiment of the present invention comprises a screw 10, a nut 20, plural rollers 30, and circulating devices 40.

The screw 10 is provided in the surface thereof with at least two helical grooves which are a first helical groove 11 and a second helical groove 12.

The nut 20 is provided with helical grooves opposite to the screw 10, and the helical grooves of the nut 20 are a first helical groove 21 and a second helical groove 22. The nut 20 is further axially provided with receiving holes 23 in a peripheral wall thereof. The number of the receiving holes 23 is the same as that of helical grooves of the nut 20. Each receiving hole 23 is provided with a fixing groove 24 at each of two ends thereof. The nut 20 is screwed on the screw 10.

The rollers 30 are respectively arranged between the helical grooves 11, 12, 21, 22 of the screw 10 and the nut 20.

The circulating devices 40 have the same number as the helical grooves 11, 12 of the screw 10, and each circulating device 40 includes a circulating tube 50 and two circulating components 60. The circulating tube 50 includes a passage 51 with an interface 52 at each of two ends thereof. Each circulating component 60 includes a return passage 61 with an opening 62 at each of two ends thereof in such a manner that each circulating device 40 includes an opening 62 at each of two ends thereof, and the passage 51 is arranged between the two openings 62 at two ends of each circulating device 40. The circulating tube 50 is arranged in the receiving hole 23. The respective circulating components 60 are installed in the helical grooves 11, 12, 21, 22 and the fixing grooves 24 in such a manner that one of the openings 62 of each return passage 61 is connected with the passage 51 of the respective circulating tubes 50, and the other of the openings 62 of the return passage 61 is respectively aligned with the helical grooves 11, 12, 21, 22. The openings 62 of the two circulating components 60 of each circulating device 40, which are connected to the helical grooves 11, 12, 21, 22, are respectively connected to the helical grooves 21, 22 of the nut 20 in order, so that the helical grooves 21, 22 form a single circulation path for the rolling of the rollers 30 through the respective circulating devices 40.

Figure 3:
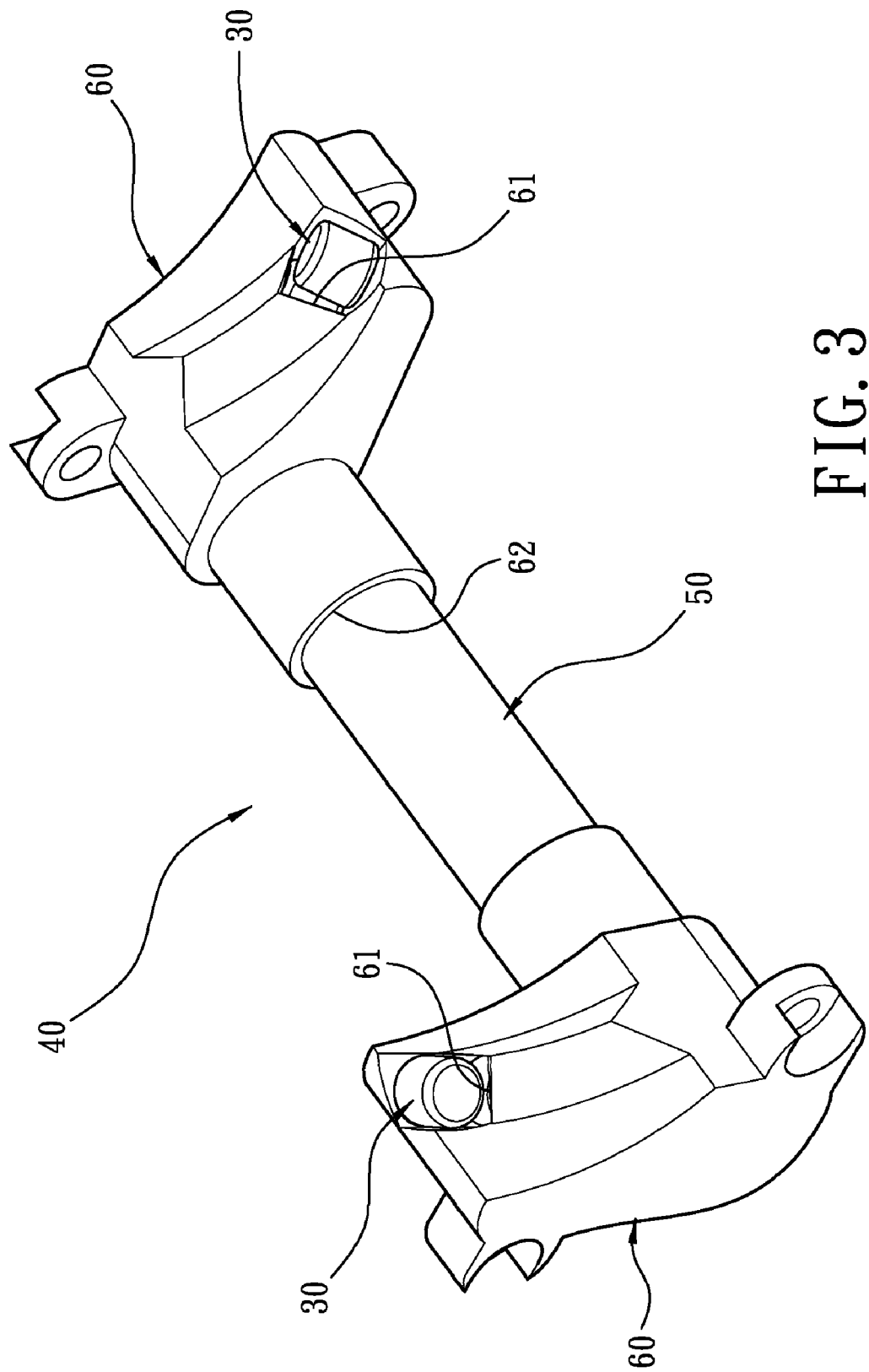
FIG. 3 is a perspective view of a circulating device in accordance with the present invention.
Figure 4:
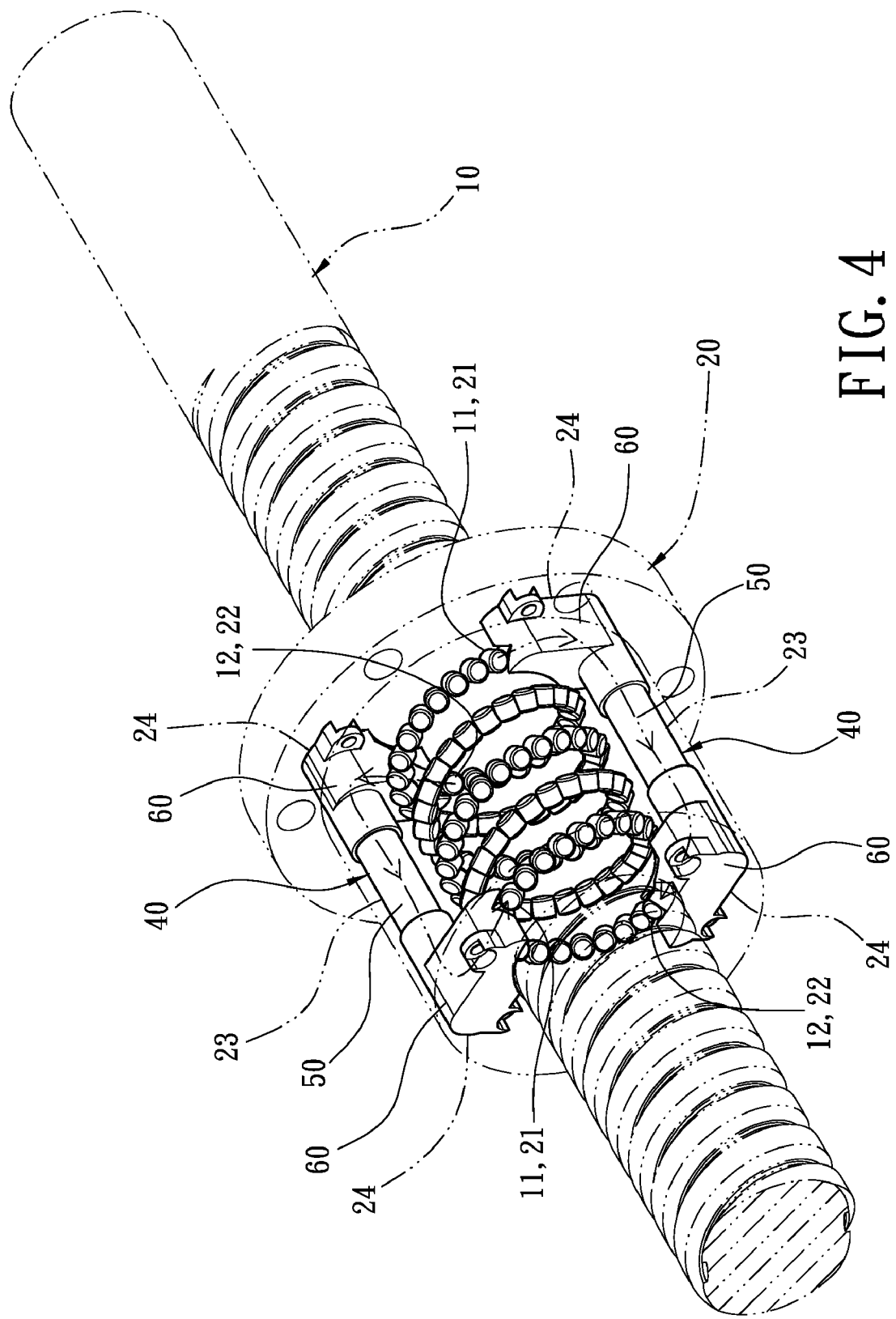
FIG. 4 is a cross-sectional view of the roller screw having plural circulating devices cooperating with plural helical grooves in accordance with the present invention.

Structure combination is as shown in FIGS. 1, 3 and 4. One of the openings 62 of one of the circulating components 60 of one of the circulating devices 40 is connected to the start portion of the first helical grooves 11, 21 of the screw 10 and the nut 20, and one of the openings 62 of the other of the circulating components 60 of the one of the circulating devices 40 is connected to the end portion of the second helical grooves 12, 22 of the screw 10 and the nut 20. One of the openings 62 of the return passage 61 of one of the circulating components 60 of the other of the circulating devices 40 is connected to the start portion of the second helical grooves 12, 22, and one of the openings 62 of the other of the circulating components 60 of the other of the circulating devices 40 are connected to the end portion of the first helical grooves 11, 21. By such arrangements, a single circulation path is formed for the rollers 30.

Figure 5:
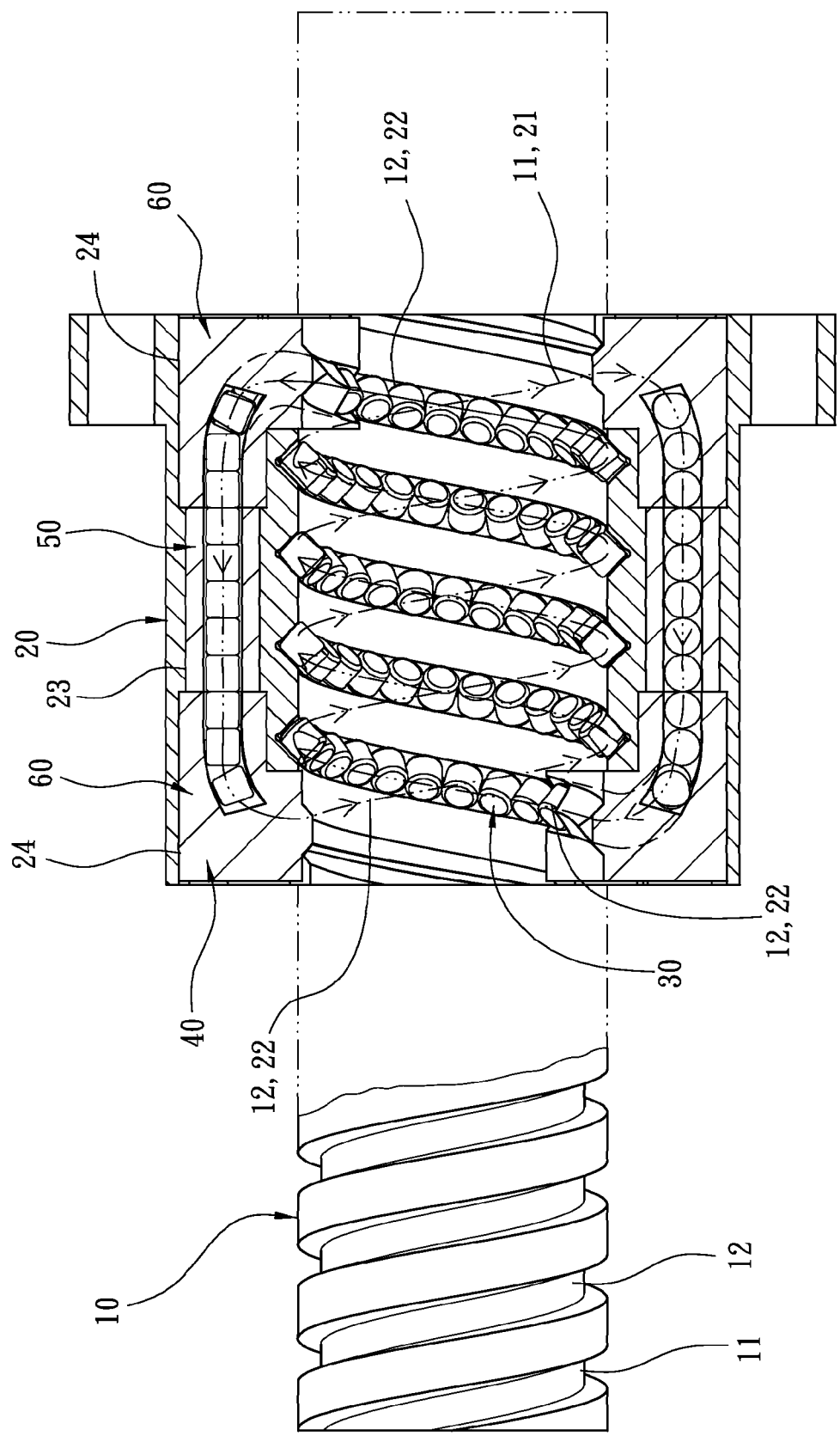
FIG. 5 is a cross-sectional view illustrating the rolling process of the rollers in accordance with the present invention.

As shown in FIGS. 4-5, the screw 10 and the nut 20 rotate relative to each other, so that the respective rollers 30 in the circulating path defined by the two circulating tubes 50, four circulating components 60 and helical grooves 11, 12, 21, 22 move in the tangent direction of the helical grooves 11, 12, 21, 22 of the screw 10 and the nut 20. The rollers 30 move through the opening 62 at one end of one of the circulating devices 40, one circulating tube 50, the opening 62 at the other end of the one of the circulating devices 40, the start portion of the second helical grooves 12, 22, the end portion of the second helical grooves 12, 22, the opening 62 at one end of the other of the circulating devices 40, the other circulating tube 50, and the opening 62 at the other end of the other of the circulating device 40 from the start portion of the first helical grooves 11, 21 to the first helical grooves 11, 21 to realize circulation.

As known from the above embodiment, the present invention has the following advantages: one screw 10 of the present invention cooperates with a single nut 20 which is interiorly provided with two circulating devices 40 to communicate the first helical grooves 11, 21 with the second helical grooves 12, 22, so that the rollers 30 can circulate between the screw 10 and the nut 20 in a single circulation mode while rotating in different directions in the different helical grooves 11, 21 and 12, 22, as a result of this, the present invention can bear bi-directional load and thus have a much better performance and a double load capacity, in addition, the circulation is realized through the two openings 62 at two ends of the circulating device 40 and a passage 51 between the two openings 62 of the circulating device 40, so that the present invention has the advantages: simplified structure, easy to fabricate and assemble, without high precision fabrication and installation.

While we have shown and described various embodiments in accordance with the present invention, it is clear to those skilled in the art that further embodiments may be made without departing from the scope of the present invention.

What is claimed is:

1. A roller screw having plural circulating devices cooperating with plural helical grooves, comprising:

a screw being provided in a surface thereof with at least two helical grooves;

a nut being provided with helical grooves opposite to the screw and further axially provided with receiving holes in a peripheral wall, the receiving holes and the helical grooves of the nut being equal in number, and each receiving hole having a fixing groove at each of two ends thereof;

plural rollers being respectively arranged in the helical grooves of the screw and the nut;

circulating devices being equal in number to the helical grooves of the screw, each circulating device having an opening at each of two ends thereof and a passage between the two openings, the circulating devices being installed in the respective receiving holes and fixing grooves of the nut; and the two openings of the respective circulating devices, which are connected to the helical grooves, are connected to different helical grooves of the nut, so that the helical grooves of the nut form a single circulation path for the rollers through the respective circulating devices.

2. The roller screw having plural circulating devices cooperating with plural helical grooves as claimed in claim 1, wherein each circulating device includes a circulating tube and two circulating components;

the circulating tube is arranged in the receiving hole of the nut and includes a passage with an interface at each of two ends thereof; and each circulating component includes a return passage with an opening at each of two ends thereof, the two circulating components of each circulating device are respectively installed in the helical grooves and the fixing grooves in such a manner that one of the openings of each return passage is connected to the passage of the circulating tube and the other of the openings of the return passage is aligned with the helical grooves.

3. The roller screw having plural circulating devices cooperating with plural helical grooves as claimed in claim 1, wherein the respective circulating devices are arranged closely in parallel in the peripheral wall of the nut.

4. The roller screw having plural circulating devices cooperating with plural helical grooves as claimed in claim 1, wherein each of the screw and the nut includes a first helical groove and a second helical groove, one of the openings of the return passage of one of the circulating components of one of the circulating devices is connected to a start portion of the first helical grooves, one of the openings of the return passage of the other of the circulating components of the one of the circulating devices is connected to an end portion of the second helical grooves, one of the openings of the return passage of one of the circulating components of the other of the circulating devices is connected to a start portion of the second helical grooves, and one of the openings of the return passage of the other of the circulating components of the other of the circulating devices is connected to an end portion of the first helical grooves, thus forming a single circulation path for the rollers.

* * * * *